United States Patent [19]
Roesslein

[11] 3,788,774
[45] Jan. 29, 1974

[54] POWER OUTPUT REGULATED PUMP ARRANGEMENT

[75] Inventor: Helmuth Roesslein, Lohr/Main, Germany

[73] Assignee: G. L. Rexroth GmbH, Lohr/Main, Germany

[22] Filed: Jan. 10, 1973

[21] Appl. No.: 322,516

[30] Foreign Application Priority Data
Jan. 11, 1972  Germany............................ 2201046

[52] U.S. Cl...................... 417/218, 60/444, 60/452, 417/217, 417/222, 137/625.61
[51] Int. Cl........................................... F04b 49/00
[58] Field of Search...... 417/217, 218, 222; 60/450, 60/452, 444; 137/625.61; 91/506

[56] References Cited
UNITED STATES PATENTS

| | | | |
|---|---|---|---|
| 3,672,166 | 6/1972 | Isaac | 60/450 |
| 3,650,108 | 3/1972 | Isaac | 60/450 |
| 3,214,911 | 11/1965 | Kempson | 60/450 |
| 3,486,334 | 12/1969 | Miller | 417/218 |
| 3,349,801 | 10/1967 | Grundmann | 137/625.61 |

FOREIGN PATENTS OR APPLICATIONS

| | | | |
|---|---|---|---|
| 1,929,645 | 12/1970 | Germany | 417/222 |
| 1,212,672 | 11/1970 | Great Britain | 417/222 |

Primary Examiner—Carlton R. Croyle
Assistant Examiner—Gregory P. LaPointe
Attorney, Agent, or Firm—Michael S. Striker

[57] ABSTRACT

An adjustable main pump whose output volume is controlled by a servomotor operated by an auxilliary pump controlled by control valves, is provided with pressure regulating cylinder and piston means receiving fluid from the auxilliary pump and supplying fluid to the servomotor through the control valves. A pressure responsive piston is controlled by high pressure fluid from the outlet of the adjustable main pump, and acts on the regulating piston, forming a variable throttle therewith for controlling the flow from the regulating cylinder to a low pressure discharge conduit, or to the servomotor, depending on the pressure exerted by the pressure responsive piston on the regulating piston, so that the product of pump pressure and pumped volume, representing the power output of the main pump, remains constant during regulating movement of the pressure responsive piston.

12 Claims, 2 Drawing Figures

POWER OUTPUT REGULATED PUMP ARRANGEMENT

BACKGROUND OF THE INVENTION

The present invention relates to an arrangement for regulating and maintaining constant the power output of an adjustable pump. Apparatus of this type is known in which the main pump is adjusted by servo-control means, and for maintaining a constant power output, a pressure valve is provided whose pressure adjustment is carried out by means of a follow-up control which has two control edges. The control piston of the follow-up control is adjusted by a piston subjected to the pump pressure. The pressure regulation is very sensitive, and requires additional dampening elements for suppression of oscillations. When servo-control means are used for adjusting the pump, the required amount of control fluid for operating the servovalve is very small, so that in this case, dampening of the pressure regulating apparatus is practically impossible.

SUMMARY OF THE INVENTION

It is one object of the invention to provide an adjustable and regulatable pump which, using a small amount of control fluid, assures a reliable regulation of the pump depending on output volume and pump pressure so that a constant output power is obtained.

In accordance with an embodiment of the invention, the regulating arrangement comprises a pressure chamber connected by a throttle with a source of control fluid, and by a variable throttle which is influenced by the pump output pressure, with a low pressure discharge reservoir, while the pressure chamber is bounded by a piston on which the pressure of the source of control fluid acts, the piston being biased by a spring against the pressure of the control fluid, while the position of the piston is determined by a pressure responsive piston responding to the pressure in the output conduit of the pump. The position of the regulating piston, which determines the pressure required for operating the servo-control means, is determined exclusively by the variable throttle connected with the discharge reservoir, so that a stable regulation of the pump to maintain a constant power output is assured.

In a preferred embodiment of the invention, the regulating piston is a differential piston whose two cylinder chambers are connected by a throttle with each other. This obtains a dampening of the movements of the regulating piston, and eliminates oscillation of the regulating means. The variable throttle is preferably formed by a port of a passage in the piston rod of the regulating piston, and by the end face of the piston rod of the pressure responsive piston, or by a separately movable part thereof. The bore ending in the port is preferably perpendicular to the end face of the piston rod of the pressure responsive piston on which the pump output pressure acts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
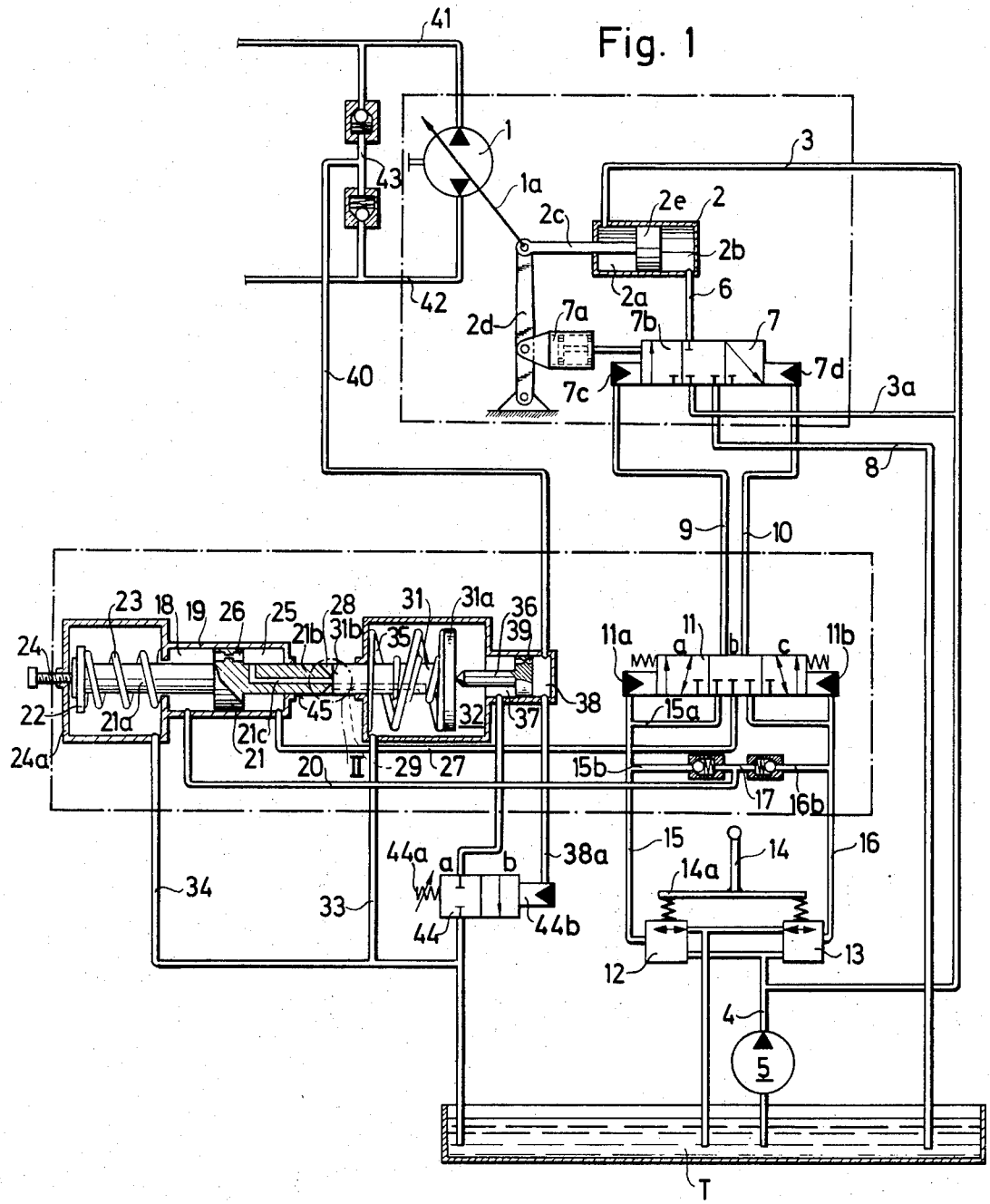
FIG. 1 is a schematic and diagrammatic view, partially in section, illustrating an adjustable pump whose power output is regulated in accordance with an embodiment of the invention.

A main pump 1 is provided with adjusting means 1a operated by a servomotor 2, whose cylinder chamber 2a which contains the piston rod 2c, is connected by a conduit 3 directly with the pressure conduit 4 of an auxiliary pump 5 which supplies control fluid. The other cylinder chamber 2b of the servomotor 2, is connected by a conduit 6 with a hydraulically operated servovalve 7, which connects cylinder chamber 2b either through conduit 3a with the auxiliary pump 5, or by conduit 8 with a low pressure reservoir T. From the servovalve 7, two control conduits 9 and 10 lead to a control valve 11 which has three positions a, b, c between which the valve can be operated by hydraulic devices 11a and 11b connected by conduits 15 and 16 with pressure valves 12 and 13 which can be operated by the manual lever 14 by means of a bar 14a acting through springs on the pressure valves 12 and 13 when handle 14 is angularly displaced. Pressure of the control fluid from the source 5, set by the pressure valve 12, operates through conduit 15 the hydraulic device 11a to move the control valve 11 from the position b to the position a, while the pressure set by the pressure valve 13 effects through control conduit 16 the operation of the hydraulic device 11b for shifting the control valve 11 from the position b to position c. In the position b, in which all connections are interrupted, the slide, now shown, of the control valve 11 is held by springs 11c in the central control position b.

When the handle 14 is operated to actuate the pressure valve 12, the pressure thereof is set in accordance with the angular displacement of handle 14. The pressure acts not only through conduit 15 on the control valve 11 to shift the same from the position b to the position a, but also in the branch conduit 15a, and through conduit 9 on the hydraulic device 7c for shifting the servo valve 7 from the illustrated neutral position to an operative position in which the cylinder chamber 2b is connected by conduit 6, the conduit portion 3a, and conduit 3, directly with the source of control fluid 5. Since the effective surface of piston 2e in cylinder chamber 2b is greater than the annular effective surface of the piston 2e in the cylinder chamber 2a, piston means 2e, 2c move into the cylinder chamber 2a, and operate the adjusting means 1a of the pump 1 out of the inoperative position in which no fluid is pumped, in a direction which causes an increase of the pumped volume.

During this movement of servo piston 2e with piston rod 2c, the return lever 2d and the spring 7a shift the control piston 7b of the control valve 7 back to the initial position so that the connection between the cylinder chamber 2b and the source of control fluid 5 is interrupted. When the pressure in cylinder chamber 2b has been reduced so far that the forces acting on opposite sides of the servo piston 2e balance each other, the adjusting operation is completed. The position of servo piston 2e of servomotor 2 is determined by the set pressure of the pressure valve 12, together with the spring characteristic of the spring 7a which connects the control piston 7b of the control valve 7 with the return lever 2d and piston rod 2c. The return lever 2d is mounted for angular movement on a stationary point, and is pivotally connected with the piston rod 2c.

If the handle 14 is turned in the direction of the pressure valve 13, the pressure valve 12 returns to its initial position in which the control conduit 15 is connected with the low pressure reservoir T. In the same manner, the servo piston 2e of the servomotor 2 returns to its initial position, so that the main pump 1 is regulated to the zero position of the adjusting means 1a in which the pumps 1 idles. The pressure adjustment of the pressure valve 13 follows in accordance with the angular position of the handle 14. The control valve 11 is thereby shifted to the position c. Due to the flow of control fluid to the hydraulic device d through the control conduit 10, the servo piston b of the servo valve 7 is displaced to the position in which the cylinder chamber 2b is connected with the reservoir T. Due to the pressure differential between the cylinder chambers 2a, 2b; servo piston 2e moves into the chamber 2b and displaces through piston rod 2c the main pump 1 in the opposite fluid transporting direction, the amount of pumped fluid being determined by the angle which the adjusting means 1a is turned.

The control conduits 15 and 16 which connect the pressure valves 12 and 13 with the control valve 11, are connected by conduit portions 15b and 16b, and by a pair of check valves 17, with a conduit 20 which leads to a first chamber 18 formed in a pressure regulating valve 19 by the piston 21 which also forms a second chamber 25 connected by conduit 27 with the control valve 11. In the chamber 18, the same pressure prevails which acts on the servo valve 7. Regulating piston 21 has a piston rod portion 21a which projects through chamber 18 out of the regulating cylinder, and carries a spring plate 22 on which a spring 23 rests which urges regulating piston 21 toward the abutment screw 24 which is secured to the housing and forms a fixed, but adjustable, stop.

A throttling duct passes through regulating piston 21, and connects the first regulating chamber 18 with the second regulating chamber 25 which is connected by conduit 27 with the control valve 11 in such a manner that the pressure fluid in chamber 25, control conduits 9 and 10, and hydraulic devices 7c and 7b, always opposes the control pressure acting on the servo valve 7 and being produced by the pressure valves 12 and 13.

Figure 2:
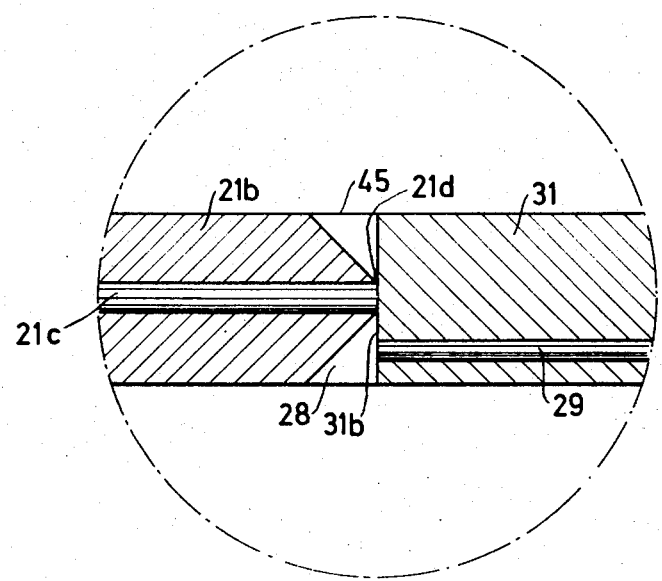
FIG. 2 is a fragmentary sectional view on an enlarged scale, illustrating the region II of FIG. 1.

Regulating piston 26 has a piston rod extension 21b which has a central axial bore 21c which connects the chamber 25 with a space 28, best seen in FIG. 2. The bore 21c forms a port 21d at the center of the space 28. The end face 31b of an intermediate part 31, abuts the end of piston rod portion 21b in the region of the port 21d, and the bore 21c is perpendicular to the end face 31b. The intermediate part 31 has an eccentric passage 29 connected with the space 28 at one end, and communicating with a space 32 which is connected by discharge conduits 33, 34 with the reservoir T. The port 21d of the central bore 21c cooperates with the end face 31b of the intermediate part 31 to form a variable throttle. The intermediate part 31 is biased by a spring 35 which rests on a spring plate 31a to abut a pressure responsive differential piston 36 which forms cylinder chambers 37 and 38 which are connected by the throttle 39 in piston 36 with each other.

The chamber 38 is connected by conduit 40 with the high pressure outlet of the pump by means of opposite check valves 43 which permit high pressure fluid to flow from pump 1 into chamber 38, irrespective of the direction of rotation of pump 1, obtained by adjustment of adjusting means 1a.

The above-described apparatus operates as follows:

When the manual handle 14 is angularly displaced to operate the pressure valve 12, a control pressure is built up in conduit 15 whose height is proportional to the angular displacement of the handle 14. The control pressure in conduit 15 acts on the hydraulic device 11a to displace control valve 11 from the neutral position b to the operative position a, and the same pressure is effective through conduit 20 in the first chamber 18 of the regulating cylinder piston means 19. The pressure in chamber 18 acts on piston 21 to displace piston 21 toward the right, as viewed in the drawing, against the action of spring 23. Since the pump pressure in the output conduit 40 of pump 1 is still low, the pressure responsive piston 36 cannot be displaced by this pressure against the action of the springs 35, so that the portion 21b with the end face 31b exerts no pressure on the port 21d of the bore 21c in the piston rod portion 21b. Consequently, the second chamber 25 is connected by bore 21c, space 28, channel 29 in the intermediate part 31, space 32, and discharge conduits 33, 34 with the reservoir T. The chamber 25 contains fluid at the low pressure of the reservoir T, and the same low pressure prevails in conduit 27 and control conduit 10 connecting the control valve 11 with the servo valve 7. Consequently, servo valve 7 is operated by the pressure in control conduit 9, derived from the manual adjustment of the pressure valve 12 so that conduit 6 connected with the cylinder chamber 2b of the servomotor 2, is connected with conduit portion 3a which communicates through conduits 3, 4 with the auxiliary pump 5 so that the cylinder chamber 2b is subjected to the pressure of the auxiliary pump 5 which causes movement of the differential piston 2e into the cylinder chamber 2a, so that adjusting means 1a of pump 1 is operated, and pump 1 is adjusted from idling to an operative pumping position in which the volume selected by corresponding angular displacement of handle lever 14, is pumped in one flow direction. The degree of adjustment, and the pumped volume, depend on the pressure set by operation of the pressure valve 12, of the control fluid supplied by the auxiliary pump 5, influenced by the characteristics and properties of the spring 7a.

As long as chamber 25 is connected with the reservoir T, the pressure supplied from conduits 15, 20 to the chamber 18, acts on regulating piston 21 to move the same into the chamber 25, overcoming the resilient force of spring 23 which is mounted on the piston rod 21a of regulating piston 21.

If the pressure of the adjustable pump rises, and the pressure fluid in conduit 40 and chamber 38 becomes higher, the pressure responsive piston 36 moves the intermediate part 31 against the action of springs 35 to the left, as viewed in the drawing, so that the portion 21b and piston 21 are displaced by the intermediate part 31 to a position corresponding to the pressure present in the cylinder chamber 38, which is the output pressure of the main pump 1. Due to the closing of the port 21d by the end face 31b, communication between the regulating chamber 25 and the low pressure reservoir T is interrupted. When chamber 25 is no longer connected with reservoir T, the pressure rises in the chamber 25 due to the connection of chamber 25 with chamber 18 by the throttle duct 26.

The pressure in chamber 25 rises until the force acting to move regulating piston 21 into chamber 18, together with the force of spring 23, displace regulating piston 21 into chamber 18, so that the port 21d of the central bore 21c, which is connected with the regulating chamber 25, separates from the end face 31b of the intermediate part 31, whose position is determined by piston 36 in accordance with the output pressure of pump 1 in outlet pressure conduit 40.

When port 21d separates from end face 31b, a connection with reservoir T is established through a space 28 bounded by the guide bore 45 and end face 31b, a channel 39 communicating with space 28, and provided in the intermediate part 31, see FIG. 2, and also through the spring housing space 32 and discharge conduit 33. The port 21d cooperates with the end face 31b as a variable throttle for the fluid flowing through the constant throttle duct 26 in regulating piston 21 from regulating chamber 18 to regulating chamber 25. The distance which the end face 31b separates from port 21d, depends on the position of the pressure responsive piston 36 and on the position of the end face 31b of the intermediate part 31 which is biased into engagement with the pressure responsive piston 36 by the spring 35. The space between port 21d and end face 31b, and the degree of opening of the variable throttle formed by the same, adjusts itself automatically, since a distance too great or too small and the corresponding pressure variation in the regulating chamber 25, will disturb the equilibrium of forces at the regulating piston 21. An unbalancing of the forces acting on regulating piston 21 in the event of a change of position of the pressure responsive piston 36, and thereby of the end face 31b, is compensated by a corresponding displacement of the regulating piston 21 to a new position.

In this manner, in any position of the intermediate part 31, in which the end face 31b cooperates with the port 21d, the maximum pressure in regulating chamber 25 corresponds to the force of spring 23, and the force of fluid from auxiliary pump 5 in regulating chamber 18.

The farther regulating piston 21 with piston rod 21b is displaced by the intermediate part 31 to chamber 18, with a corresponding release of spring 23, the greater must be the pressure in regulating chamber 25 for maintaining the balancing of the forces acting on the regulating piston 21.

The pressure prevailing in chamber 25, which depends on the position of the pressure responsive piston 36 and on the output pressure of the pump 1, is transmitted through the regulating conduit 27 and the control valve 11 to the hydraulic device 7c and 7d which is opposite to the side which is subjected to the pressure from pressure valves 12 or 13, and acts in the same direction as spring 7a.

For maintaining equilibrium at the slide 7b of the servo valve 7, the sum of the force of spring 7a and of the slide 7b subjected in the same sense by the regulating valve 19, must be equal to the opposite force acting on the slide 7b of the servo valve 7 due to the pressure set at the pressure valves 12 or 13.

If the pressure in regulating chamber 25, and thereby the pressure acting on the slide 7b of the servo valve 7 in the same direction as spring 7a, after a pressure variation, the slide 7b is shifted in one or the opposite direction for again establishing a balancing of the forces. At a rising pressure in chamber 25, the slide 7b is displaced in the same direction in which spring 7a exerts force, and at dropping pressure, slide 7b is displaced opposite to the direction of force of spring 7a until the forces acting on the slide 7b of the servo valve 7 are again balanced.

Since each operation of the servo valve 7 causes operation of the servomotor 2 and adjustment of pump 1, each variation of the pressure in chamber 25 of the regulating valve 19, brings about a corresponding variation of the amount of fluid pumped by pump 1. Since the pressure in regulating chamber 25 of the regulating valve 19 is determined by the position of the pressure responsive piston 36 together with the spring biased intermediate part 31, and since the position of the pressure responsive piston 36 depends on the pump output pressure and on the characteristics of springs 35 which act on the intermediate part 31 to oppose the pump pressure, the volume of fluid pumped by the main pump 1 is determined in accordance with the pump pressure by the regulating valve 19. Since the spring characteristic of the springs 35 which oppose the pump pressure have a hyperbolic configuration, and since the adjustment of pump 1 is linear to the movement of the pressure responsive piston 36, the product of the pressure of pump 1 and its pumped volume of fluid, representing the output power, remains constant during regulating movement of the pressure responsive piston 36. If the pump pressure rises so high that a further displacement of the regulating piston 21 of regulating valve 19 by the pressure responsive piston 36 and intermediate part 31 in a direction into the chamber 18 is blocked by the adjustable abutment screw 24, the end face 31b of the intermediate part 31 completely closes the port 21d of the bore 21c so that, by means of throttle 26 in regulating piston 21, the same pressure is obtained in chamber 25 as in chamber 18. This causes at the same time pressure equalization at the hydraulic devices 7c and 7d acting on the slide 7b of the servo valve 7 so that the servo valve 7 is adjusted by spring 7a until the main pump 1 has been set back to zero flow. In this position, spring 7a is also relieved.

Instead of the adjustable abutment screw 24, the housing wall 24a may be used as a fixed abutment for limiting the displacement of regulating piston 21 with piston rod 21a. In this event, a closure valve 44 is provided for limiting the pressure. The valve 44 is connected between the annular chamber 37 bounded by pressure responsive piston 36, and the low pressure reservoir T, and has a closed position a into which it is urged by spring 44a, which is adjustable, and an open position b in which it is displaced by hydraulic device 44b supplied with high pressure fluid from chamber 38 by conduit 38a. When the pump pressure in conduit 40 and chamber 38 reaches the pressure to which the spring 44a was set, the closure valve 44 is shifted out of the closed position a to the open position b, and connects the annular chamber 37 with the reservoir T. As a result, the pump pressure in the chamber 38 displaces the pressure responsive piston 36 against the force of springs 35 acting on the intermediate part 31, so that when piston rod 21a of regulating piston 21 abuts the fixed abutment 24a, the end face 31b of the intermediate part 31 closes the port 21d of the bore 21c in the piston rod 21b of regulating piston 21, so that the same pressure develops in chamber 25 that is present in chamber 18, due to the throttle duct 26 in regulating piston 21.

Due to the fact that in the operative condition of the pressure responsive piston 36 of the regulating piston 21, the variable throttle formed by port 21d and end face 31b of intermediate part 31, permits the flow of control fluid continuously into the reservoir T, the amount of leakage fluid being determined by the constant throttle 26 in regulating piston 21, an almost completely oscillation-free setting of the control pressure building up in the regulating chamber 25 is obtained, and thereby also an oscillation-free adjustment of the main pump 1 by the servo valve 7 which is operated by the same control pressure.

In a modified arrangement, intermediate part 31 may have an additional part whose end face cooperates with the port 21d to form a variable throttle.

It will be understood that each of the elements described above, or two or more together, may also find a useful application in other types of regulated pump arrangements differing from the type described above.

While the invention as been illustrated and described as embodied in a power output regulated pump arrangement with a regulating valve and a piston responsive to the output pressure of a regulated pump, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Power output regulated pump arrangement, comprising pump means having at least one high pressure conduit, and output volume adjusting means; servo motor means including a source of fluid under pressure, a hydraulic servo motor for operating said adjusting means, and control valve means connecting said source with said servo motor; and regulating means including a regulating cylinder, and a regulating piston forming in said regulating cylinder a first chamber connected with said source and a second chamber, a throttle duct means connecting said source with said second chamber and being connected with said control valve means for controlling said source to operate said servo motor, said regulating piston having a first portion projecting out of said regulating cylinder and being formed with a channel connecting said second chamber with a port in said first portion, first spring means biassing said regulating piston to move into said first chamber, pressure responsive piston means having a second portion and being urged by high pressure in said high pressure conduit toward said first portion so that said first and second portions abut each other and form with said port a variable throttle, and second spring means biassing said pressure responsive piston means away from said first portion, said second portion forming a passage connecting said second chamber with a low pressure discharge conduit through said variable throttle, said passage being closed when high pressure acting on said pressure responsive piston means closes said variable throttle.

2. Regulated pump arrangement as claimed in claim 1 wherein said throttle duct means penetrates said regulating piston for connecting said first and second chambers so that fluid from said source flows through said first chamber and said throttle duct means into said second chamber.

3. Regulated pump arrangement as claimed in claim 1 wherein said pressure responsive piston forms first and second cylinder chambers, said first cylinder chamber being connected with said high pressure conduit, said second portion projecting from said said second cylinder chamber, and wherein said pressure responsive piston has a throttle connecting said first and second cylinder chambers.

4. Regulated pump arrangement as claimed in claim 3 wherein said pressure responsive piston is a differential piston.

5. Regulated pump arrangement as claimed in claim 3 wherein said second portion has a flat end face, and wherein said first portion has said port cooperating with the center of said flat end face to form said variable throttle.

6. Regulated pump arrangement as claimed in claim 5 wherein said passage in said first portion ending in said port is perpendicular to said flat face.

7. Regulated pump arrangement as claimed in claim 1 wherein said secon portion includes a first part integral with said pressure responsive piston, and a second part aligned with said first part and biassed by said second spring means against said first part and said pressure responsive piston, said second part having an end face forming with said port said variable throttle.

8. Regulated pump arrangement as claimed in claim 1 wherein said regulating piston means has a piston rod projecting through said first chamber out of said regulating cylinder; and comprising an abutment means engaged by said piston rod in an end position after movement of said regulating piston by said pressure responsive piston due to high pressure in said high pressure conduit against the action of said second spring means.

9. Regulating pump arrangement as claimed in claim 8 wherein said abutment means includes a threaded member.

10. Regulated pump arrangement as claimed in claim 1 comprising a stationary cylinder in which said pressure responsive piston means forms first and second cylinder chambers, said first cylinder chamber being connected with said high pressure conduit; and comprising a valve having an open position connecting said second cylinder with a low pressure discharge area, and a closed position.

11. Regulated pump arrangement as claimed in claim 10 comprising actuating means for said valve including a pressure conduit connected with said first cylinder chamber and means operated by the pressure in said pressure conduit to open said valve, and adjustable spring means for closing said valve at low pressure in said high pressure conduit means.

12. Regulated pump arrangement as claimed in claim 1 wherein said throttle duct means penetrates said regulating piston for connecting said first and second chambers so that fluid from said source flows through said first chamber and said throttle duct means into said second chamber, wherein said pressure responsive piston froms first and second cylinder chambers, said first cylinder chamber being connected with said high pressure conduit, said second portion projecting from said second cylinder chamber, wherein said pressure responsive piston has a throttle connecting said first and second cylinder chambers, and wherein said pressure responsive piston is a differential piston.

* * * * *